US010715347B2

(12) United States Patent
Lapsley

(10) Patent No.: US 10,715,347 B2
(45) Date of Patent: Jul. 14, 2020

(54) BUILDING AUTOMATION MANAGEMENT

(71) Applicant: Econowise Drives and Controls Ltd., Horley, Surrey (GB)

(72) Inventor: David Michael Lapsley, Horley (GB)

(73) Assignee: ECONOWISE DRIVES AND CONTROLS LTD. (GB)

(*) Notice: Subject to any disclaimer, the term of this patent is extended or adjusted under 35 U.S.C. 154(b) by 0 days.

(21) Appl. No.: 15/903,757

(22) Filed: Feb. 23, 2018

(65) Prior Publication Data

US 2018/0375678 A1 Dec. 27, 2018

Related U.S. Application Data

(63) Continuation-in-part of application No. 15/668,430, filed on Aug. 3, 2017.

(30) Foreign Application Priority Data

Jun. 21, 2017 (GB) .................................. 1709908.6
Feb. 16, 2018 (GB) .................................. 1802565.0

(51) Int. Cl.
*H04L 12/00* (2006.01)
*H04L 12/28* (2006.01)
(Continued)

(52) U.S. Cl.
CPC ............ *H04L 12/281* (2013.01); *G05B 15/02* (2013.01); *G06F 3/0488* (2013.01); *H04L 12/282* (2013.01); *H04L 12/2812* (2013.01); *H04W 4/33* (2018.02); *H04W 4/70* (2018.02); *H04W 4/80* (2018.02); *G05B 2219/2642* (2013.01); *H04L 2012/285* (2013.01)

(58) Field of Classification Search
None
See application file for complete search history.

(56) References Cited

U.S. PATENT DOCUMENTS 9,306,763 B2   4/2016   Tatzel et al.
9,337,943 B2   5/2016   Mosebrook et al.
(Continued)

FOREIGN PATENT DOCUMENTS

WO        0108151 A1    2/2001
WO     2014011946 A1    1/2014

OTHER PUBLICATIONS

Search Report issued in Great Britain Patent Application No. 1709908.6 dated Nov. 7, 2017.

*Primary Examiner* — Paul B Yanchus, III
(74) *Attorney, Agent, or Firm* — Kim IP Law Group PLLC

(57) ABSTRACT

A method of building automation control from a computing device is provided and includes a computing device: accessing a building automation network through one or more network connections and identifying automated devices attached to that building automation network; determining a user interface structure for the automated devices and a device user interface for each automated device from device names of the automated devices on the building automation network; providing a user interface comprising the user interface structure and the device user interfaces on the computing device; and controlling one or more of the automated devices over one of the one or more network connections using instructions received over the user interface.

16 Claims, 7 Drawing Sheets

(51) Int. Cl.
   *G06F 3/0488*   (2013.01)
   *H04W 4/33*     (2018.01)
   *G05B 15/02*    (2006.01)
   *H04W 4/80*     (2018.01)
   *H04W 4/70*     (2018.01)

(56) References Cited

U.S. PATENT DOCUMENTS

| | | |
|---|---|---|
| 2008/0244421 A1 | 10/2008 | Chen et al. |
| 2008/0277486 A1 | 11/2008 | Seem et al. |
| 2009/0065596 A1 | 3/2009 | Seem et al. |
| 2010/0138007 A1 | 6/2010 | Clark et al. |
| 2010/0274366 A1* | 10/2010 | Fata ................. G05B 15/02 700/7 |
| 2011/0087988 A1 | 4/2011 | Ray et al. |
| 2011/0088000 A1 | 4/2011 | Mackay |
| 2012/0023215 A1 | 1/2012 | Tseng et al. |
| 2014/0018940 A1 | 1/2014 | Casilli |
| 2015/0160628 A1 | 6/2015 | Kalafut et al. |
| 2015/0341184 A1 | 11/2015 | Tatzel et al. |
| 2016/0330285 A1 | 11/2016 | Brophy et al. |
| 2017/0357607 A1* | 12/2017 | Cayemberg ........... G06F 13/362 |
| 2018/0278434 A1* | 9/2018 | Maseng .............. H04L 12/2836 |

* cited by examiner

BUILDING AUTOMATION MANAGEMENT

CROSS-REFERENCE TO RELATED APPLICATIONS

This application is a continuation-in-part of and claims priority to U.S. patent application Ser. No. 15/668,430, filed Aug. 3, 2017. This application also claims priority to Great Britain Patent Application No. 1802565.0, filed Feb. 16, 2018, and Great Britain Patent Application No. 1709908.6, filed Jun. 21, 2017. The entire disclosures of U.S. patent application Ser. No. 15/668,430, Great Britain Patent Application No. 1802565.0, and Great Britain Patent Application No. 1709908.6 are incorporated herein by reference in their entireties for all purposes.

FIELD OF INVENTION

The present invention relates to building automation management. In particular embodiments, the invention relates to methods and apparatus for user control of automation systems within a building over a network connection.

BACKGROUND OF INVENTION

Building automation involves development of a system to monitor and control different systems within a building that are appropriate to control in this way. Some such systems—such as HVAC (heating, ventilation and air conditioning)—may have an existing control interface that needs to be integrated with other systems. Other elements—such as lighting, door control, and curtains and blinds—may be provided as part of a controlled system with an appropriate interface.

Individual systems within a building are typically proprietary, and there may be proprietary variation in their native control interfaces. Where individual systems need to be integrated into an overall control system, it is desirable to have a consistent way to address functionally equivalent items from different proprietors. One approach to addressing this issue is the BACnet (Buildings Automation and Control network) communication protocol developed by ASHRAE (the American Society of Heating, Refrigerating and Air-Conditioning Engineers) and standardized under ASHRAE/ANSI Standard 135 and ISO 16484-5. The BACnet protocol defines a number of services for communication between building devices and a set of BACnet object types.

BACnet is effective for identification and control of controllable systems networked within a building and controlled by one (or more) controllers of a building control system within that network. A number of proprietary building control systems, some designed for large automated buildings, others designed for home use. Typically such systems require very significant setup, as they require population of a proprietary control system, typically requiring extensive manual input and often requiring engineering knowledge. When the building control system has been fully set up, a user is provided with systems information to allow for monitoring and control of the building systems through a proprietary user interface.

In order to make the setup process more effective, it was proposed in US 2016/0330285 to provide a controller with an integrated wireless network chip. The controller could then use accessible networks to discover controllable devices, which could then be identified as suitable for control by the building system controller and a control system for them developed according to the functionality of the building control system. A user can then interact with the building system controller over a suitable user interface. A similar discovery system is taught in US 2014/0018940 for the purpose of establishing a building model, which can then be used for testing and optimisation of a building management system during development.

It would be desirable to achieve an approach to management of automated building systems that would allow user set up and control that could be achieved rapidly and without detailed engineering knowledge.

SUMMARY OF INVENTION

In a first aspect, the invention provides a method of building automation control from a computing device, comprising the computing device: accessing a building automation network through one or more network connections and identifying automated devices attached to that building automation network; determining a user interface structure for the automated devices and a device user interface for each automated device; providing a user interface comprising the user interface structure and the device user interfaces on the computing device; and controlling one or more of the automated devices over one of the one or more network connections using instructions received over the user interface. This approach is particularly effective as it allows a user to build a suitable controller interface "on the fly" from discovery of the automated devices available in the environment of interest to the user, and does not require central control or extensive setup.

In embodiments, the user interface structure is determined from a device name on the building automation network. Such a device name may comprise a primary keyword representing a device location, and it may also comprise one or more secondary keywords representing a device control function. In particular embodiments, the building automation network uses a BACnet protocol, and wherein said device name is an identification for a BACnet object. This approach uses conventions and structures built into existing protocols such as BACnet to allow effective creation of a user control interface.

In embodiments, identifying automated devices comprises identifying devices associated with one or more access nodes on the building automation network. In particular cases, this may comprise identifying devices associated with a plurality of access nodes, and wherein the user interface structure organises automated devices by location rather than by access node. The user interface may then provide an option to apply default device settings for one or more of said locations—for example, a default set of values to be used if a room or region of the building is occupied. In some cases, an access node may be merely a means of accessing a particular network. In others, the access node may also be a control node adapted for control of one or more devices.

In embodiments, the building automation network is adapted so that multiple computing devices can control the automated devices.

In embodiments, the method further comprises providing user feedback from a user of the computing device to the building automation system.

In embodiments, the method may further comprise reporting changes to automated device state to the automated building network.

In embodiments, there may be an administration server associated with the building automation network, wherein changes made to automated device state from the user computing device may be reported to the administration server.

In a second aspect, the invention provides a computing device adapted to operate as a building automation controller, the computing device comprising a processor, a memory, a user interface means and a network communication means, wherein the processor is adapted to perform an application in the memory to carry out the functions of: accessing a building automation network through the network communication means and identifying automated devices attached to that building automation network; determining a user interface structure for the automated devices and a device user interface for each automated device; providing a user interface comprising the user interface structure and the device user interfaces on the user interface means; and controlling one or more of the automated devices through the network communication means using instructions received over the user interface.

In embodiments, the computing device is further adapted to provide user feedback to the building automation system from the user interface, and in embodiments the computing device is adapted to report changes made to automated device state from the computing device to an administration server.

In a third aspect, the invention provides an administration server for use with a building automation network, wherein the administration server is adapted to communicate with one or more access nodes in the building automation network and is adapted to communicate with one or more computing devices adapted to access the building automation network and establish themselves as controllers for automated devices associated with the one or more access nodes, wherein the administration server is adapted to receive notification of changes made to automated device state from the one or more computing devices.

This administration server may be further adapted to receive user feedback from users of the one or more computing devices.

In a fourth aspect, the invention provides a system comprising an administration server for use with a building automation network, wherein the administration server is adapted to communicate with one or more computing devices adapted for building automation control as described above. Advantageously, said administration server is adapted to receive information concerning building control from the one or more computing devices. Preferably, the administration server is adapted to evaluate building network performance from this information, and preferably the administration server is also adapted to provide building network performance data to the one or more computing devices for analysis.

BRIEF DESCRIPTION OF FIGURES

Embodiments of the invention will now be described, by way of example, with reference to the accompanying Figures, of which.

DESCRIPTION OF SPECIFIC EMBODIMENTS

Figure 1:
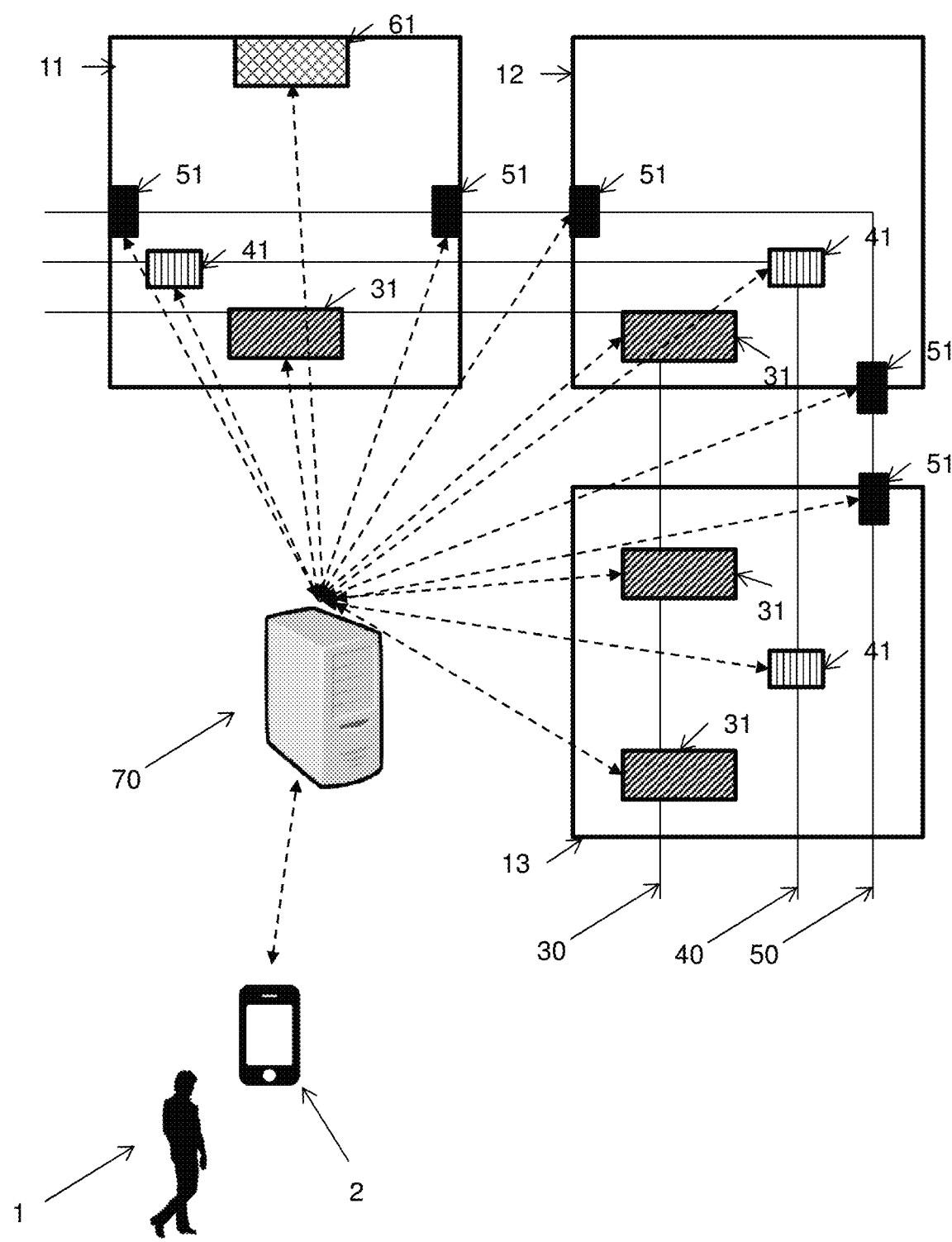
FIG. 1 shows control of building automation systems with a conventional building management system.

FIG. 1 shows control of building automation systems with a conventional building management system. The building comprises a number of rooms or zones 11, 12, 13, each of which may contain one or more automated devices 31, 41, 51, 61. These automated devices may be standalone devices, or part of a system. Three exemplary systems are shown—heating, ventilation and air-conditioning (HVAC) system 30, lighting system 40 and a door control system 50, each of which may have one or more associated devices in each room or zone. The automated device may be a local controller (such as a thermostat) adapted to control the HVAC devices in that room or zone to achieve the intended control result. Blinds 61 in room 11 are shown as a separate, directly controlled device. This is of course only an exemplary arrangement and other systems and devices may be controlled using the same approach, or these devices and systems excluded from building management if desired.

The devices are networked, either directly (for example, over a local wireless network, or by a wired network) or indirectly (via their connection to the system of which they form a part, which is then itself connected to other networks) to a building automation controller 70. The building automation controller 70, in this case a suitably programmed server of a proprietary building management system, forms a hub of a building automation network. Typically this will use BACnet as a protocol for communication with automated devices, but may also use a proprietary protocol. If BACnet is used, each controlled device will have a name and properties appropriate to its location and function according to the conventions of the BACnet protocol. The building automation controller runs a proprietary building management application for which each device and/or system to be controlled has been identified and registered, and in which an overall control system has been developed.

A user 1 will have access to the building automation controller 70 through an appropriate user interface. This may be, for example, through the user's mobile telephone 2 or other computing device, which connects through an appropriate network connection (such as a local wireless network) to the building automation controller 70. The user interface may require the user 1 to provide credentials to log in to the building automation controller 70, and when it is established that the user 1 is a legitimate user the user 1 has access to some or all of the functionality of the building automation controller 70.

Figure 2:
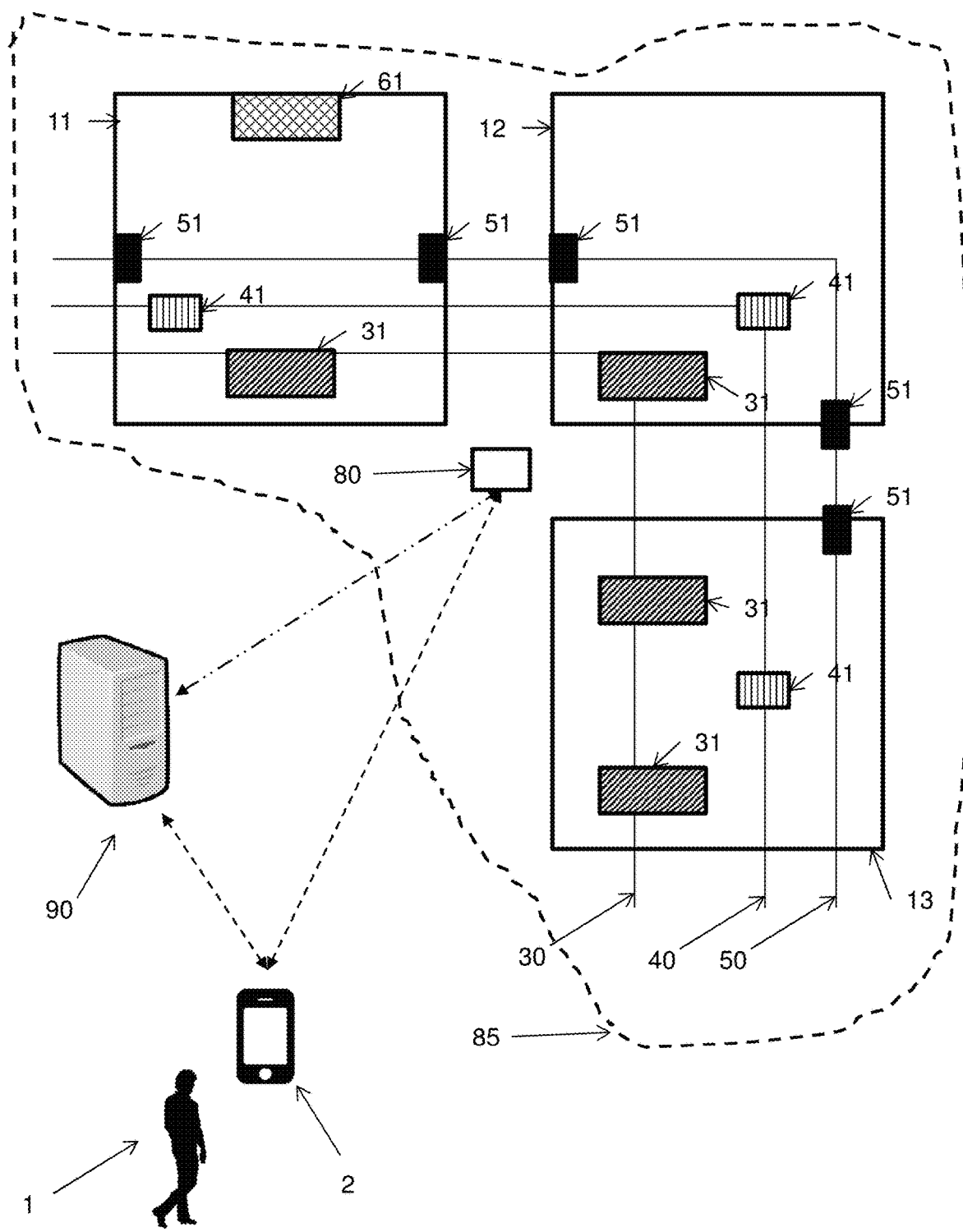
FIG. 2 shows control of building automation systems according to an embodiment of the present invention.

FIG. 2 shows control of building automation systems according to an embodiment of the present invention. The system is similar to the system of FIG. 1, but in this case no building automation controller is required (or, alternatively, a building automation controller may be present, but used for a separate set of systems or devices, or some systems and devices may be under dual control). It is necessary for the devices and/or systems to be networked, and for a building automation network to exist, but this may simply identify the devices and/or systems and their functionality rather than providing control, or simply allow access to the network so that a network node can discover this information from other network nodes—an access node 80 is shown for this purpose. The networked zone 85 to which access node 80 provides access is shown, but individual connections are not shown for clarity—individual devices within the networked zone may all be considered part of the network to which access node 80 allows access.

Access nodes 80 may be implemented differently in different embodiments. In some embodiments, an access nodes (or some access nodes) may simply be used to gain access to a network, typically a local network handling IP traffic—in this case the access node 80 may simply have the function of a router. In other embodiments, the access node 80 may be a control node itself used to control one or more devices. Such an access node 80 (or another connection) may in embodiments also be accessed by a specialist superuser through an appropriate interface for system configuration—a connection to administration server 90 is shown for this purpose. As discussed below, administration server 90 has a different purpose to building automation controller 70, and does not act as a gateway to the building automation control network of networked zone 85.

The user 1 again has a mobile telephone 2 or other computing device, and this connects through an appropriate network connection (such as a local wireless network) to the building automation network. However, in this case, rather than providing an interface to a building automation controller, the user computing device discovers the devices present on the network and develops a control interface on the fly, allowing ad hoc control of an existing building automation network. In FIG. 2, this is shown by connection to access node 80, which allows access to the building automation network and allows mobile telephone 2 to act directly as a user controller, rather than just a user interface for controller 70 as in the FIG. 1 case. Where the BACnet protocol is used, the naming conventions and device properties attributed to devices using BACnet are used to populate this control interface. BACnet protocol may be used over an IP network, so standard networking arrangements may be used. The mobile telephone 2 also may connect as needed to the administration server 90.

Figure 3:
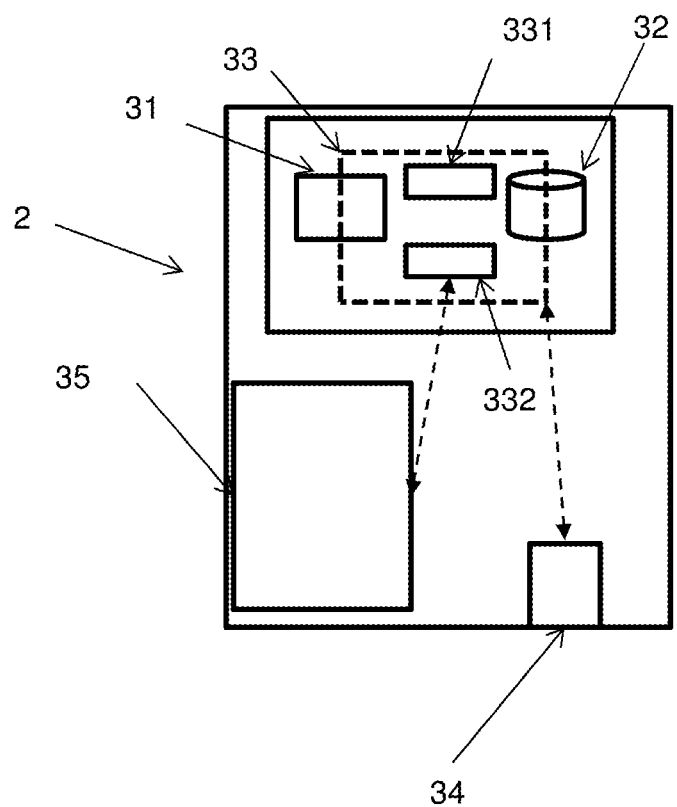
FIG. 3 shows a user computer device suitable for implementing embodiments of the invention.

FIG. 3 shows a user computer device suitable for implementing embodiments of the invention. This may in principle be any user computing device, but in practice is most likely to be a mobile telephone 2. The mobile telephone 2 has a processor 31 and a memory 32 together defining a computing environment 33 supported by an operating system 331 appropriate to the device (such as Android or iOS). The computing environment 33 supports the operation of one or more applications, with building management application 332 being used to provide embodiments of the present invention. The mobile telephone 2 has a touchscreen user interface 35 which is used by the building management application 332 to provide a control interface to the user. The mobile telephone also has a wireless communications interface 34 providing connection to cellular telephony networks, and also connection to local wireless communication networks using WiFi or other suitable protocols.

Figure 4:
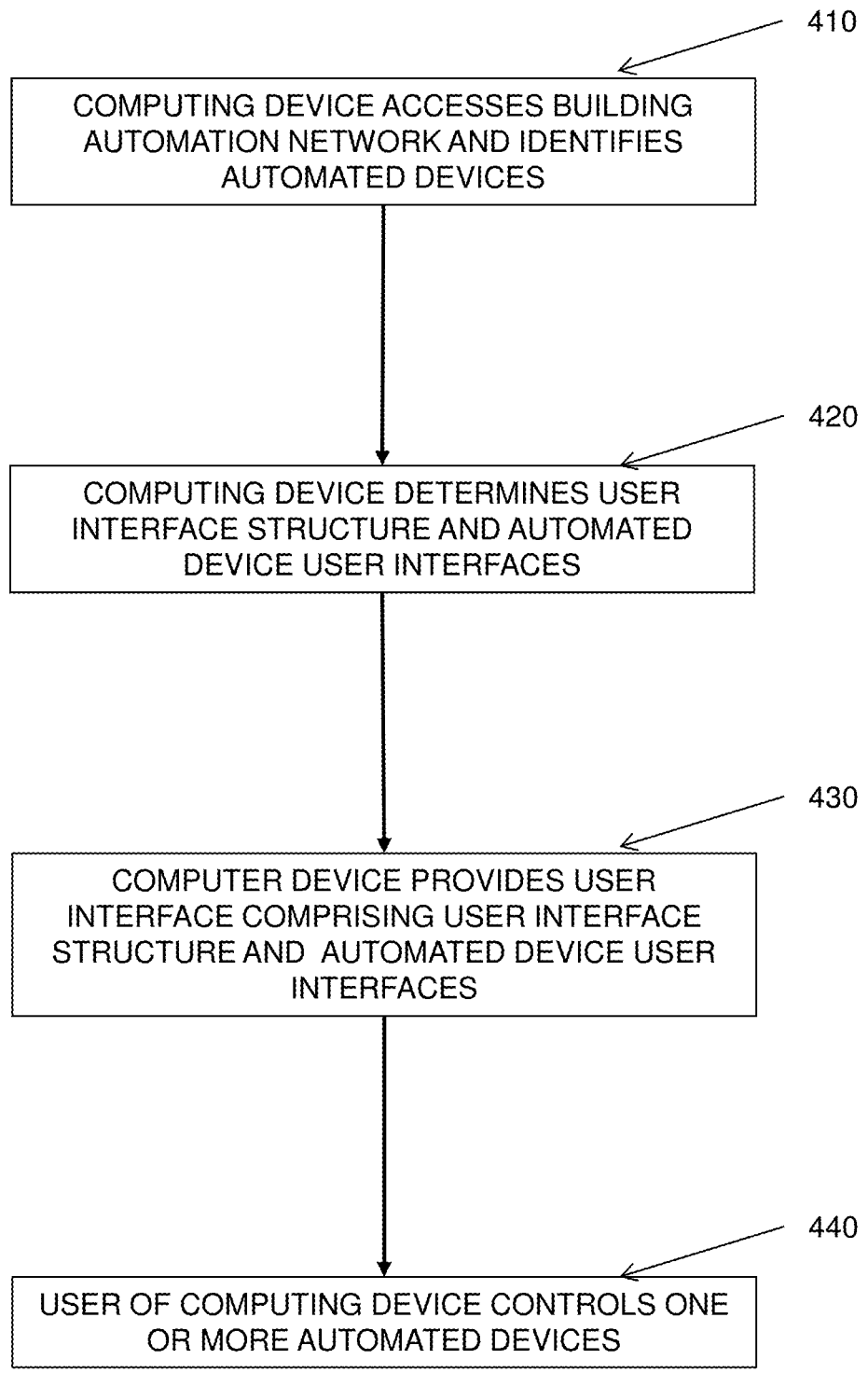
FIG. 4 shows a process of creation of a building management control interface according to embodiments of the present invention.

FIG. 4 shows a process of creation of a building management control interface according to embodiments of the present invention. The steps are taken at a user computing device as shown in FIG. 3, and allow control of automated devices from that user computing device.

First of all, the computing device accesses 410 a building automation network through one or more network connections and identifying automated devices attached to that building automation network. The building automation network may be a BACnet network, but the approach used here could in principle be used with other building automation network protocols.

The computing device then determines 420 a user interface structure for the automated devices and a device user interface for each automated device. As will be described in detail below, in embodiments this may be done by using BACnet naming conventions and BACnet object properties. In other embodiments other approaches may be used, such as use of metadata associated with automated devices and discoverable by the computing device.

The computer device then provides 430 a user interface comprising the user interface structure and the device user interfaces on the computing device. This allows the user of the computing device to control 440 one or more of the automated devices over one of the one or more network connections using the user interface.

This approach allows direct user control of automated devices in a building automation network without a preconfigured central controller. Control can take place directly after a dynamic process of discovery and user interface creation that can take place directly after the user computing device accesses the building automation network.

Figure 5:
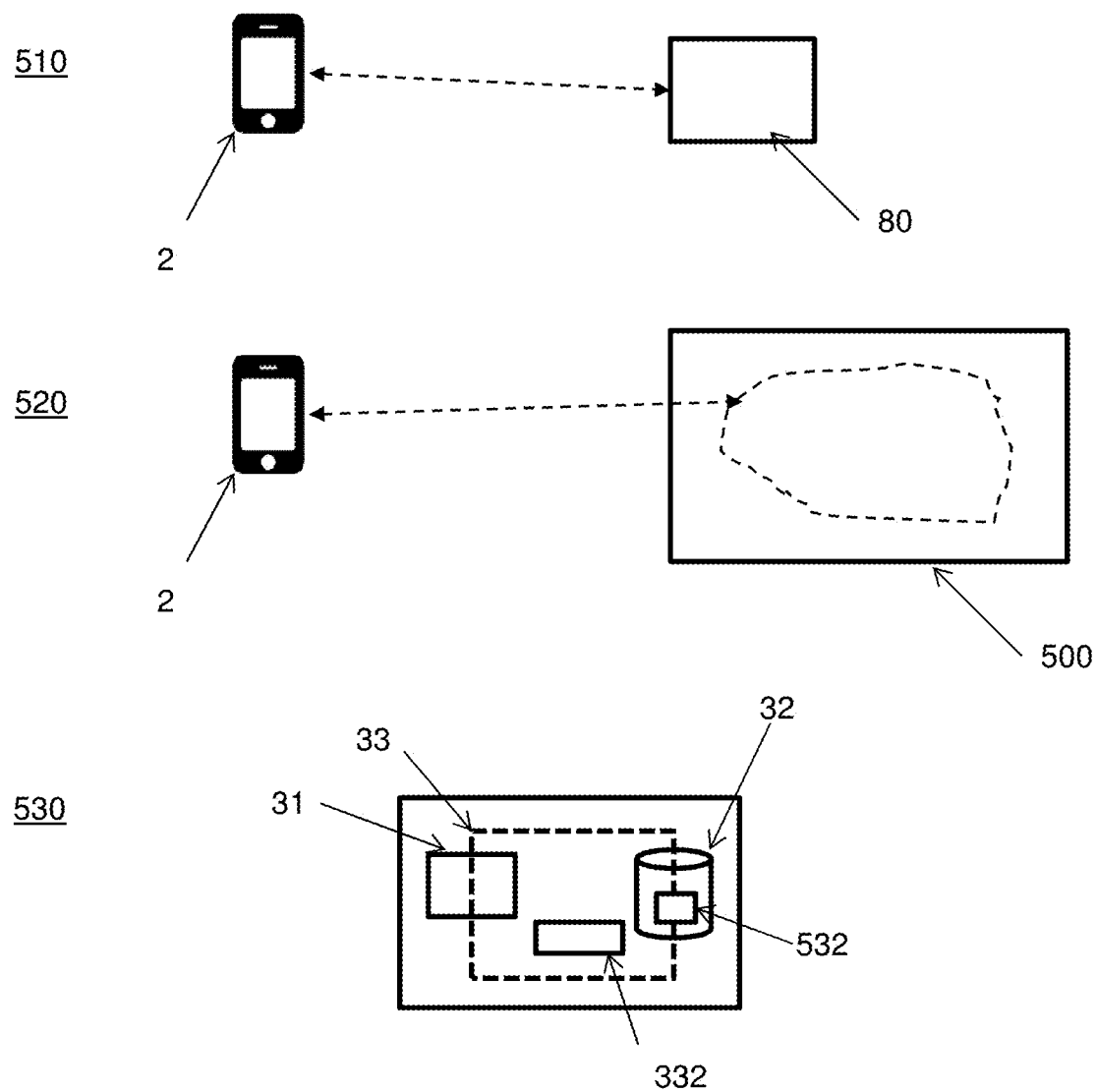
FIG. 5 illustrates an embodiment of a discovery stage of FIG. 4 in greater detail.

FIG. 5 illustrates an embodiment of a discovery stage of FIG. 4 in greater detail. There may be an initial set up stage for the building management application 332 on the user computing device 2 (hereafter this combination will be referred to as "the user computing device 2" for convenience where unambiguous). At this point the user may be given a base IP address, port and controller ID for use by the building management application—on initial use there may also be a user validation stage requiring connection to the administration server 90 (or another validation server) to determine that the user is a legitimate user of the application with permission to access a particular building automation network. In some cases, the building automation network may relate to a large building of which the user is one of several legitimate users—typically in these cases the access nodes may be accessed by multiple users and each user may control some or all of the controlled devices, which will then generally be under shared control. In other cases, the access node may be for a single home and the user may be the only user of the access node.

The first stage 510 is for the user computing device 2 (specifically, the building control application on the user computing device 2, but this will be abbreviated for simplicity) to access the building automation network 500, for example by making a connection to the access node 80 (as shown in FIG. 2), or in other arrangements simply by joining a local network to which automated devices are already connected—the user computing device may simply use the IP address 80 of the access node to access it, which as noted above may have been programmed in to the user computing device 2 on application setup. The access node 80 may be open, or may require the user computing device 2 to complete a security protocol (such as a system login, or provision of a credential for user identification) before the user computing device 2 can access the building automation network. When the user computing device 2 has access, it then sends a message to ask for identification and functionality of automated devices local to that network. This information may be obtained from the access node 80, or may involve direct discovery of objects on the network, but in either case in this embodiment will provide BACnet information for each object allowing control over BACnet. Device and Object Discovery are provided as available services within BACnet, so standard BACnet commands can be used to obtain this information.

After information from a first access node 80 is obtained, the user computing device can continue to scan 520 the network to look for further access nodes (either by being informed of, determining, or discovering their IP addresses) and controlled devices, or the user can choose not to scan further so as only to obtain an interface for local devices. The user computing device 2 has at this point a local database 532 for the building control application 332 that contains names and properties for BACnet protocol devices controllable over the building automation network for at least one part of the building.

BACnet names and properties and their relevance to implementations of the invention will now be discussed. BACnet names, or keywords, related to objects are or may be applied using certain conventions that allow meaningful identification of the relevant objects to a non-expert user, particularly when the keyword is recovered into equivalent English language text. Primary keywords typically (but not exclusively) indicate a building room or area, as exemplified in Table 1 below.

TABLE 1

Primary Keywords and Meanings

| Primary Keyword | English language text |
| --- | --- |
| FLR1 | First Floor |
| FLR5 | Fifth Floor |
| BED1 | Bedroom 1 |
| STD | Study |
| GYM | Gym |
| LIV | Living Room |
| REC | Reception |
| COMM | Comms Room |
| MTR | Metering |

Secondary keywords will generally be found associated with the primary keywords—these will indicate specific controls associated with the space indicated by the primary keyword. Exemplary controls for the "Gym" space (primary keyword GYM) are shown in Table 2 below.

TABLE 2

Secondary Keywords and Meanings

| Primary and Secondary Keyword | English language text |
| --- | --- |
| GYM TEMP | Gym Temperature |
| GYM TEMP SPNT | Gym Temperature Setpoint |
| GYM LGT LVL | Gym Light Level |
| GYM LGT ON-OFF | Gym Light On-Off |
| GYM B/ND POS | Gym Blind Position |

These are of course only exemplary primary and secondary keywords. For a full discussion of keywords available using BACnet protocol, the skilled person is directed to reference materials for BACnet protocol such as ASHRAE/ANSI Standard 135 and ISO 16484-5.

Other capabilities can also be included using this learned information. Identified room information may also be used to populate a room booking application. A room booking diary maintained either on site or remotely on an administration server (embodiments including an administration server are described below) may be accessible from the user interface if the room is identified as bookable. Room controls (such as temperature) may have different default values depending on whether a room is identified as occupied or not occupied in the room booking application.

Other information may also be controlled or accessed by the user interface that is not derived directly from BACnet information. In the case of the room booker, the existence of the room is identified by BACnet information (the room name), and this can then be checked against a room booker stored on a server using Internet Protocol (IP). Other updates may similarly be held on other systems and instructions sent over IP rather than BACnet.

Figure 6:
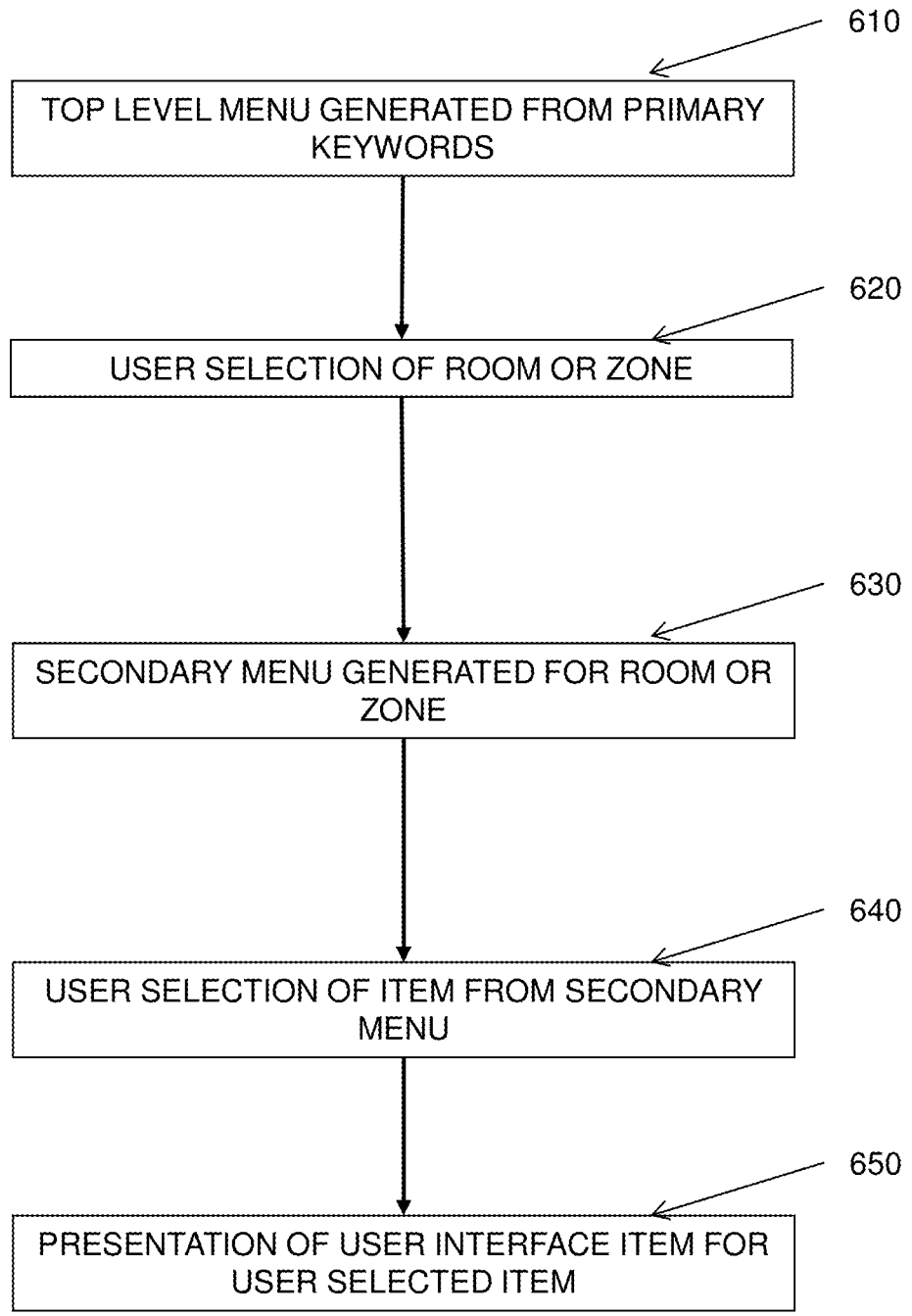
FIG. 6 illustrates an embodiment of an interface population stage of the process of FIG. 4 in greater detail.

FIG. 6 illustrates an embodiment of an interface population stage of the process of FIG. 4 in greater detail. At this point, the user computing device 2 has primary keywords typically representing zones or rooms and secondary keywords representing controls and control types, and uses them to populate a hierarchical menu-based user interface for the user, such that when a specific room or zone is selected user selectable buttons are provided with appropriate labelling for all the controlled devices (as represented by primary and secondary keyword combinations) for that room or zone.

It should be noted that user interface elements may be provided for BACnet objects that are not identified by the combination of location and property as indicated above—for example, there may be controllable BACnet objects that are not associated with a particular location, or where the primary keyword or main BACnet description relates to a controllable property or function rather than to a place. Such BACnet objects can be provided with a user interface in the same way as named rooms can be using embodiments of the invention.

It should also be noted that the user interface provided at the user computing device 2 may relate to more than one access node, but will organise the data for the user in a logical hierarchical structurally, typically based on rooms or zones. For example, there may be three access nodes relating to building control—one each for HVAC, blinds and lighting, for example—each relating to automated devices named using a BACnet protocol and using the same primary keywords for the same rooms or zones. Each of these access nodes may be interrogated in the discover stage and objects representing automated devices held in the local database in the user computing device. In construction of menus, these objects will then typically be grouped by primary keyword, so a menu for, say, the first floor zone will allow selection of any automated device in the floor zone, whichever of the three access nodes it is associated with. User selection of an action at the user computing device will initiate communication with the relevant access node.

Firstly, a top level menu is generated 610 from the primary keywords. This corresponds to a menu of the rooms or zones that the user is able to control with English language text on the user interface corresponding to the meaning of each primary keyword. The user may then select 620 a room or zone, and a secondary menu is generated 630. This secondary menu is derived from the secondary keywords associated with the primary keyword for that room or zone, and corresponds to the different controls and control types possible for that room or zone.

Digital and analogue inputs and outputs can all be assigned by the building management application 332, as described below. When a secondary menu item is selected 640, the management application 332 will determine from the secondary keyword what type of user interface item should be presented 650 on the mobile telephone touch screen.

Digital Input—This indicates a controlled device status, and will be presented as an information item on the display screen. One example is an alarm, or fault indicator—this will have two states, active or inactive. Rather than just being a displayed item, a triggering of an active state on an alarm (if the management application is currently operative and in contact with the controlled device) may result in a notification to the user which seizes focus from the currently active application, as for a normal system alarm, and the notification type may be specified at setup (for example, the alarm may be programmed to vibrate, bleep or ring). Alarms may be set to require acknowledgement if desired.

Digital Output—This generally enables switching of a device from one state to another (for example, on/off or open/close).

Analogue Input—This generally indicates a value of a controlled device parameter, such as a currently measured temperature.

Analogue Output—This generally involves the management application setting a controlled device parameter to a specified value. In the scanning phase, for objects of this type, upper and lower limits of each value will be provided as part of the BACnet information. The appropriate SI unit will also be identified or determined and displayed alongside the value.

Once the interface has been created by the application, adjustments, monitoring and control are all available to the user through the mobile telephone (or other user computer) user interface. For an analogue output, this may be by a draggable slider. For a digital output, this may be by an on-off button. Any user action may be provided with visual user feedback, such as a change in displayed values or a colour change to indicate a change of state. There may be specific outputs for some cases—for example, one special case of an analogue output would be a mode selector for a heating system. The following options could for example be selected by thumbwheel: Heating Only; Cooling Only; Fan Only; Automatic; and On/Off. The application may populate and display a thumbwheel automatically in response to the secondary keyword MDE (for mode). This is particularly appropriate for any device that has multiple modes of operation—the object name and upper and lower parameter value limits may be used to generate specific user selectable modes for display and selection.

Once a selection is made by the user at the user computing device 2, this will be communicated to allow control of the relevant automated device—typically using a BACnet protocol instruction over IP. This communication will be provided over the applicable network with the automated device. The control instruction may be a standard BACnet interaction, which may be implemented by the skilled person through knowledge of BACnet protocol and its existing implementation.

As indicated above, instructions may be provided to other systems that are not controlled through BACnet, such as a room booker held on an administration server—in cases such as this, the update may simply take place over IP for processing by the administration server.

Figure 7:
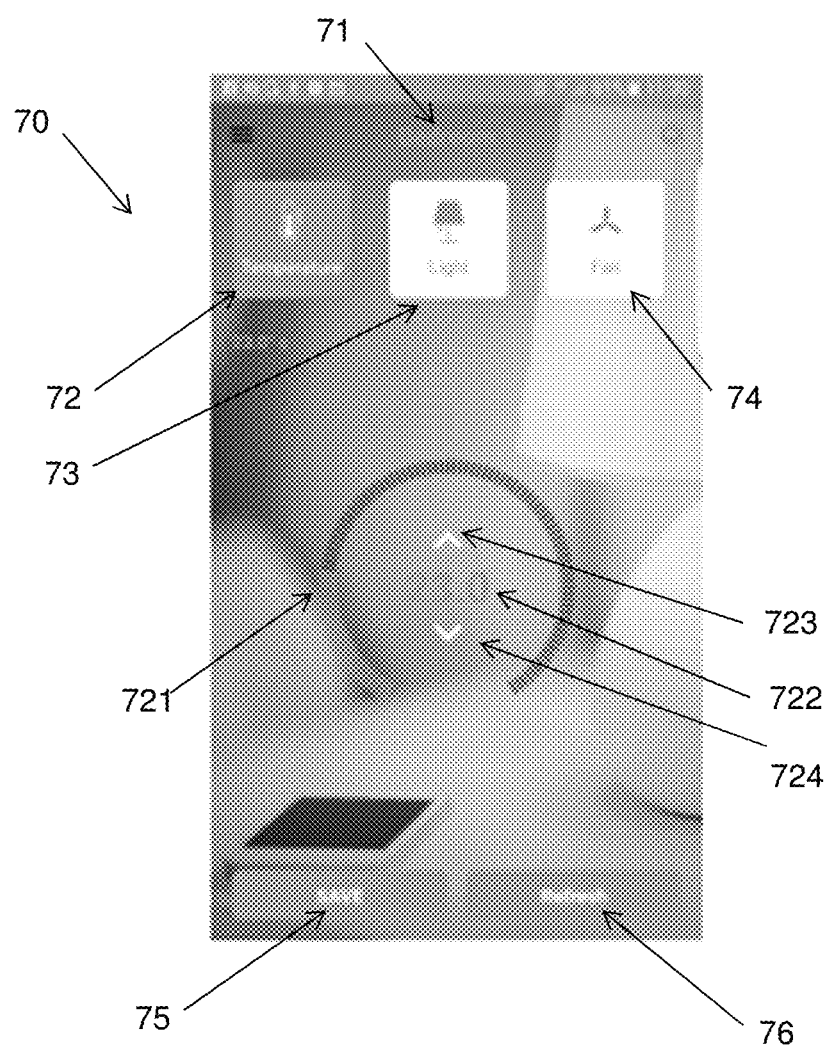
FIG. 7 illustrates a sample user interface screen for a user mobile telephone configured to act as a building management controller in accordance with an embodiment of the invention.

FIG. 7 illustrates a sample user interface screen for a user mobile telephone configured to act as a building management controller in accordance with an embodiment of the invention. The screen 70 identifies a selected zone 71 ("Bedroom 1") and the three controllable parameters in that zone: temperature 72, lighting 73 and fan activity 74. Each of these parameters is selectable—in the view shown, temperature 72 has been selected.

Temperature 72 is a numerical value within a range, represented in the display by a display dial 721 showing an analogue position in a range and a digital display 722 with increase and decrease controls 723, 724. The increase and decrease controls 723, 724 are arrows which will result in an increase or decrease in temperature on touching the screen 70, which acts as a touchscreen like any conventional smartphone interface, in the appropriate region. This is one exemplary interface to allow a user to vary a value to be set, but as the skilled person will appreciate, other interfaces customarily used on a smartphone can be employed.

When the user has changed the temperature value, this change may be saved using save button 75. The screen may be refreshed using refresh button 76. Similar screens may be used for other controls.

The user interface may update automatically if there are changes made to the controlled device values (which may be state changes, or changes resulting from action of the user or of other users), or may require manual refresh.

Status change may also result in alerts to users—these can be explicitly requested through the user interface (for example, by an interface for a particular control that allows the user to establish a rule for an alert, such as for a notification in respect of a room temperature control to be provided if the temperature of the room rises above a certain value). There may also be general alerts provided centrally by the system, which may be provided to users if certain criteria are met (for example, if the user is known to have the application in an active state—this could simply be done by providing messages to the application which will only be displayed if the application is active—or if the user has submitted an update to a particular control within a particular period of time), or which may simply be sent to all registered users (for example by e-mail or text message). System messages could be sent warning of upcoming events (such as fire alarm drills or emergency testing) or other information relevant to users of the system or of specific buildings.

If it is desirable to provide related control items through the user interface at the same time, for example multiple related analogue inputs, a "Merge" functionality can be used by using an intermediate keyword MER. For example, if in scanning the management application finds two objects with names BED MER TEMP Z1 and BED MER TEMP Z2—with the merge keyword MER intermediate between the primary and secondary keywords for BED, or "Bedroom", then this would be rendered in the user interface by displaying Bedroom Temperature Zone 1 and Bedroom Temperature Zone 2 on the same Bedroom Temperature object page. This merge capability would be implemented automatically as a result of the scanning process and would require no user intervention.

In some cases, options could be provided to allow single button presses to result in multiple updates. For example, default values can be set for a user for a room which they are occupying, and a single "occupying" button may be provided on the automatically generated menu for the room. Pressing the "occupying" button could then set all the values to the default value.

The user interface could be customised in whatever way was appropriate to a particular user—for example, a variety of different language options could be provided.

The user interface can be developed in embodiments beyond a pure monitoring and control interface, for example by allowing the user to provide feedback that can be interpreted by an administration server 90. This may be more appropriate to a large shared use building rather than in a single building controlled by an owner occupier, as it can be used in developing a plan for building management for a multiple use building, or simply to send messages to facility managers or concierge services. Pre-scripted well-being messages may be provided for selection by the user, for example the following: "I am too hot"; "I am too cold"; "I am comfortable"; and "I would like to report . . . "—the user may also be able to provide custom freeform messages in embodiments. This last message may in embodiments use a free form field, or may again involve selection from a series of possible faults or conditions of concern. If the user is not in network contact when the message is sent, it may be stored and sent when a network connection is re-established. In particular embodiments and where location services are enabled on a user mobile telephone, location may be logged against the message to allow the message to be responded to or used appropriately.

As shown in FIG. 2, an administration server 90 may provide administrator level control and monitoring of the access node 80. A single administration server 90 may provide an administration interface for all the access nodes of a building, or may provide administration interfaces as a service for a number of clients, where a client may range from a user of a single building, building services for a multiple use building, or even building services for an estate of buildings. In embodiments, the administration server 90 does not provide direct control to the building, but determines which computing devices or users are allowed to provide control, and also receives feedback from the computing devices.

An administration server 90 of this type may be employed for initial user setup. The application may be downloaded to a user device and then connect to the administration server 90 on installation for setup. The administration server may have established user groups, each user group comprising users permitted to control specific buildings or groups of buildings. The user could register with the administration server 90 at that point through a registration process typically establishing the user identity and that the user had been granted this permission. The user would then be provided with an address, or addresses, that could be used for discovery of controlled objects in the controlled building or buildings.

Communication between the user device and the administration server may be protected by end to end encryption using an appropriate encryption technology. Any encryption approach appropriate to a server client interaction could be used for this purpose.

The administration server 90 may provide levels of control (such as variation of high and low point parameters, or other changes to a BACnet controlled device profile) not available to individual users, may monitor all selections and changes made by users using their control interface, and may monitor independently of users different controlled device values—as indicated above, in embodiments the administration server 90 may not monitor the building directly but only by feedback received from user devices. All data may be exported for remote review and for analysis, and changes made to the system or to its programming made in consequence. The administration server 90 is preferably directly connected to user devices via the access node 80—for example, there may be a direct network connection between the administration server 90 and the management application (for example by having an IP address for the administration server programmed into the management application at or before user configuration) available whenever the mobile telephone has suitable network connectivity. For the provision of feedback messages, the administration server 90 may be used to prepare reply messages or to schedule maintenance indicated as necessary by feedback.

The implementation of a building automation control interface through a computing device also provides an effective tool for service engineers. Service engineers may be established as conventional users or superusers of the system, and may have additional capabilities to provide feedback and testing notes. These may be provided to the administration server 90, stored on the engineer's computing device or transmitted back to another computer associated with the service engineer. This allows service engineer interactions to be as frictionless as possible, and provides a flexible access model that may be particularly helpful in certain circumstances—for example, where the service engineer is working with a system which is not part of his regular servicing group, so he would otherwise need to spend time and effort obtaining access to the relevant controller.

The administration server 90 can log all changes made to the system, and therefore can provide analytic information to users, to service engineers, and to building owners or managers. Data may also be stored at individual controllers, or archived to a central location. Stored data may be exported in a convenient format for further analysis. Following data analysis, messages indicating actions to be taken may be fed back to users or to service engineers vai the application or otherwise. An instance of the building management application may therefore be used only for analytic purposes if required, and not for control. Using this approach, general purpose computing equipment can be used for data collection and analytics from a managed building simply by downloading, installing and configuring the building management application.

The skilled person will appreciate that the embodiments described here are exemplary, and that modifications may be made and alternative embodiments provided that fall within the scope of the invention.

The invention claimed is:

1. A method of building automation control from a computing device, comprising the computing device:
   accessing a building automation network through one or more network connections and discovering automated devices attached to that building automation network;
   constructing a user interface structure for the discovered automated devices and determining a device user interface for each automated device from discovered properties of the automated devices on the building automation network, wherein for at least one discovered automated device, the discovered properties comprise a device name which comprises a primary keyword representing a device location;
   providing a user interface comprising the user interface structure and the device user interfaces on the computing device; and
   controlling one or more of the automated devices over one of the one or more network connections using instructions provided over the user interface.

2. The method of claim 1, wherein the device name comprises one or more secondary keywords representing a device control function.

3. The method of claim 1, wherein the building automation network uses a BACnet protocol, and wherein the discovered properties comprise an identification for a BACnet object.

4. The method of claim 1, wherein discovering automated devices comprises discovering devices associated with one or more access nodes on the building automation network.

5. The method of claim 4, wherein discovering automated devices comprises discovering devices associated with a plurality of access nodes, and wherein the user interface structure organises automated devices by location rather than by access node.

6. The method of claim 5, further comprising the user interface providing an option to apply default device settings for one or more of said locations.

7. The method of claim 1, wherein the method further comprises providing user feedback from a user of the computing device to the building automation system.

8. The method of claim 1, further comprising reporting changes to automated device state to the automated building network.

9. The method of claim 1, wherein there is an administration server associated with the building automation network, wherein changes made to automated device state from the user computing device are reported to the administration server.

10. A computing device adapted to operate as a building automation controller, the computing device comprising a processor, a memory, a user interface means and a network communication means, wherein the processor is adapted to perform an application in the memory to carry out the functions of:

accessing a building automation network through the network communication means and discovering automated devices attached to that building automation network;

constructing a user interface structure for the discovered automated devices and determining a device user interface for each automated device from device names of the automated devices on the building automation network wherein for at least one discovered automated device, discovered properties comprise a device name which comprises a primary keyword representing a device location;

providing a user interface comprising the user interface structure and the device user interfaces on the user interface means; and controlling one or more of the automated devices through the network communication means using instructions received over the user interface.

11. The computing device of claim 10, wherein the device name comprises one or more secondary keywords representing a device control function.

12. The computing device of claim 10, wherein the building automation network uses a BACnet protocol, and wherein said device name is an identification for a BACnet object.

13. The computing device of claim 10, wherein the discovering automated devices comprises discovering devices associated with one or more access nodes on the building automation network.

14. The computing device of claim 13, wherein the discovering automated devices comprises discovering devices associated with a plurality of access nodes, and wherein the user interface structure organises automated devices by location rather than by access node.

15. The computing device of claim 10, wherein the computing device is further adapted to provide user feedback to the building automation system from the user interface.

16. The computing device of claim 10, wherein there is an administration server associated with the building automation network, wherein the computing device is adapted to report changes made to automated device state from the computing device to the administration server.

* * * * *